United States Patent [19]
Ito et al.

[11] 3,868,491
[45] Feb. 25, 1975

[54] SUBMERGED ARC WELDING METHOD AND FLUX CORED WIRE FOR USE IN SAME

[75] Inventors: Yoshinori Ito; Nobuyuki Yamauchi; Sadac Tanaka, all of Nishinomiya, Japan

[73] Assignee: Sumitomo Metal Industries, Ltd., Osaka, Japan

[22] Filed: Feb. 5, 1974

[21] Appl. No.: 440,127

[30] Foreign Application Priority Data
Feb. 8, 1973   Japan................................ 48-15201

[52] U.S. Cl....................... 219/146, 148/24, 219/73
[51] Int. Cl............................................. B23k 35/22
[58] Field of Search........... 148/24, 26; 219/73, 146

[56] References Cited
UNITED STATES PATENTS

| | | | |
|---|---|---|---|
| 2,697,159 | 12/1954 | Donahey | 148/26 X |
| 3,303,323 | 2/1967 | Claussen | 148/26 X |
| 3,394,238 | 7/1968 | Wilcox | 219/73 |
| 3,415,976 | 12/1968 | Smith | 219/146 |
| 3,493,713 | 2/1970 | Johnson | 219/73 X |
| 3,701,444 | 10/1972 | Clement et al. | 219/146 |
| 3,702,390 | 11/1972 | Blake et al. | 219/146 |
| 3,778,589 | 12/1973 | Nakabayashi | 219/146 |

Primary Examiner—J. V. Truhe
Assistant Examiner—N. D. Herkamp
Attorney, Agent, or Firm—Kurt Kelman

[57] ABSTRACT

A flux cored wire for submerged arc welding is formed of a tubular wire of carbon steel or low alloy steel the hollow of which is filled with flux comprising, in mixture, highly basic slag forming ingredient, deoxidizing ingredient, denitrifying ingredient, desulphurizing ingredient, highly toughening ingredient, and working property improving ingredient in a suitable composition.

2 Claims, 1 Drawing Figure

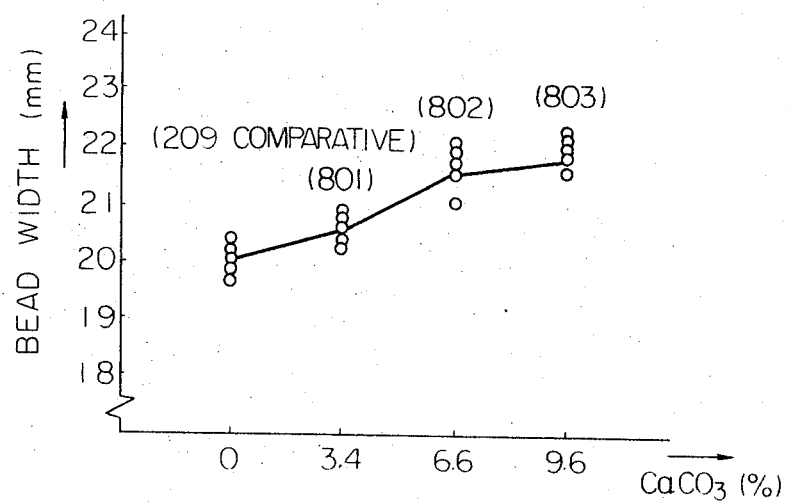

SUBMERGED ARC WELDING METHOD AND FLUX CORED WIRE FOR USE IN SAME

BACKGROUND OF THE INVENTION

The present invention relates to a submerged arc welding method of carbon steel and low alloy steel and a flux cored wire for use in said method.

In submerged arc welding of steel, there is a need for high efficiency and high speed in welding, and in reply to the need multiple electrode high speed welding and large heat input welding are used. Another need in the art is toughening of deposited metal. Although many attempts have been made to satisfy these two needs, none of them has been entirely successful in satisfying them simultaneously.

For example, by making the composition of the welding flux strongly basic, oxygen content of the deposited metal is reduced to improve the Charpy impact characteristic of the deposited metal zone, to thereby attain the toughening of the deposited metal. However, when such a strong basic flux is used, arc is made unstable to drastically decrease the weld working property, to thereby make the high speed welding impossible.

While such an attempt to add highly toughening elements, for example, molybdenum and nickel, to the deposited metal zone can improve the Charpy impact characteristic of such zone, it has a few disadvantages such that it is difficult to drastically improve the toughness and to properly regulate the strength that tends to increase too acutely. Further, the improvement in toughness of the deposited metal can be attained to a certain extent also by increasing the cooling rate of the weld zone owing to decrease in the amount of welding heat input. However, this method has a disadvantage that welding efficiency is considerably reduced.

Heretofore, it has been known to use a flux cored wire in submerged arc welding. The heretofore known flux cored wire comprised a hoop of carbon steel or low alloy steel having a welding flux and alloying elements filled therewithin. Such prior art flux cored wire, however, has very limited uses such, for example, as for adding high alloy compositions to weld metal as in buildup welding of stainless steel, because composite wire has problems in manufacture and in weld working property and that such flux cored wire can be sufficiently replaced by solid wire in practical uses.

In the case where a high toughness is required, addition of active alloying elements, such as Ti, Al, B, is indispensable. However, solid wire cannot provide such required active elements sufficiently since solid wire is oxidated when manufactured and, does not retain sufficient activity until welding. Accordingly, it cannot attain high toughness. However, the active elements can be freely added by flux cored wire since the manufacture of the flux cored wire includes no melting step.

Even when the flux cored wire is used, however, the desired high toughness cannot be attained unless suitably selected elements are added as the filling materials.

Heretofore, accordingly, the prior art flux cored wire was used mainly for the purposes such, for example, as to adding alloying elements in large amount and to improve the working property but has never been used for attaining high toughness.

SUMMARY OF THE INVENTION

Accordingly, it is the object of this invention to provide a new submerged arc welding method for toughening the deposited metal and improving the weld working property and to provide also a flux cored wire for use in such method.

It is the characteristic feature of the submerged arc welding method according to the present invention to use in the submerged arc welding a flux cored wire including therein as the filling flux a high basic slag forming composition, deoxidizing agent, denitrifying agent, and high toughening elements in combination with a fused-type or bond-type flux. The filling flux used in the present method will be described hereinunder in more detail. In the method according to the present invention, submerged arc welding is carried out using the flux cored wire, formed by enclosing the filling flux according to the present invention with a hoop material of carbon steel or low alloy steel, as the welding electrode in combination with a fused-type or bond-type flux.

The submerged arc welding method is carried into practice preferably in the following forms:

1. Single electrode method

Welding is carried out using the flux cored wire in combination with a fused-type or bond-type flux.

2. Multiple electrode method

Flux cored wire is used for all the welding electrodes in combination with the fused-type or bond-type flux, or, the flux cored wire is used for only one or two of the multiple of electrodes the balance thereof being solid wires in combination with the fused-type or bond-type flux.

3. Water cooling submerged arc welding method (single electrode and multiple electrodes)

Submerged arc welding is carried out with the underside of the bead cooled by water to increase the cooling rate of the weld zone.

The present invention contemplates to use the flux cored wire for these forms of submerged arc welding. To this end, the compositions of the filling flux of the flux cored wire must be adjusted according to the form of welding method described above. For example, in two-electrode method, when a flux cored wire is used for an electrode and a solid wire for the other electrode, the compositions of the filling flux of the flux cored wire must be used in larger quantity than in the case where both electrodes are flux cored wires.

The filling flux of the flux cored wire according to the present invention comprises, in suitable combination, high basic slag forming composition, deoxidizing composition, denitrifying composition, desulphurizing composition, high toughening composition, and working property improving composition.

The hoop material of the flux cored wire according to the present invention is generally made of such material as carbon steel or low alloy steel. The material for the hoop should be selected according to the compositions of the welding and including fluxes used in combination to obtain the characteristics required in the weld zone. In the present invention, carbon steel or low alloy steel having the following composition is used: 0.01 – 0.10% C, trace – 0.3% Si, trace – 1.5% Mn, 0 – 1.5% Mo, 0 – 3.0% Ni, and the balance iron.

In the flux cored wire according to the present invention, it is preferable that the flux ratio [weight of including flux/weight of hoop material × 100(%)] is in the range between 12 and 30 percent in view of the forms of submerged arc welding, welding flux used in combination therewith and production thereof. When the flux ratio is 12 percent or less, the increase in thickness owing to the increase in weight of the hoop material makes the forming thereof difficult. On the other hand, when the flux ratio is 30 percent or more, the increase in the amount of filling flux and the decrease in thickness owing to the decrease in weight of the hoop material make the filling of the flux and the forming of the hoop impossible. Generally, the material in the thickness of 0.2 – 0.5 mm is used in the production of the hoop material.

Combinations of the filling fluxes and hoop materials in various compositions of the flux cored wire according to the present invention are shown in Table 1.

according to the present invention includes a large amount of strong basic slag forming compositions as the including flux and, accordingly, the welding flux to be used in combination therewith can well be neutral or weak basic, the present invention has an advantage that there is no decrease in weld working property. This is possible only when the flux is included within the flux cored wire.

In the present invention, the filling flux containing a large amount of calcium fluoride ($CaF_2$) is used to reduce the oxygen content of the deposited metal, and the elements aluminum (Al), titanium (Ti) and boron (B) are added to strengthen the deoxidization and to effect the denitrification.

Table 1

| Item Number | Hoop Material (A) (wt%) | | | | | |
|---|---|---|---|---|---|---|
| | C | Si | Mn | Mo | Ni | Fe |
| 100 | Carbon Steel, or Low Alloy Steel | | | | | |
| 200 | 0.01~0.10 | 0~0.3 | 0~1.5 | 0~1.5 | 0~3.0 | Balance |
| 300 | Carbon Steel, or Low Alloy Steel | | | | | |
| 400 | Carbon Steel, or Low Alloy Steel | | | | | |
| 500 | Carbon Steel, or Low Alloy Steel | | | | | |
| 600 | 0.01~0.10 | 0~0.3 | 0~1.5 | 0~1.5 | 0~3.0 | Balance |
| 700 | Carbon Steel, or Low Alloy Steel | | | | | |
| 800 | 0.01~0.10 | 0~0.3 | 0~1.5 | 0~1.5 | 0~3.0 | Balance |

| Item Number | Filling Flux (B) (wt%) | | | | | | | | | Flux Ratio B/A(%) |
|---|---|---|---|---|---|---|---|---|---|---|
| | $CaF_2$ | Al | Ti | Mo | B | Ni | Mn | Fe | Others | |
| 100 | 25~98 | 0.1~2.5 | 0.8~15 | 0.8~15 | 0.02~0.50 | 0~25 | 0~15 | 0~70 | — | 12~30 |
| 200 | 25~98 | 0.1~2.5 | 0.8~15 | 0.8~15 | 0.02~0.50 | 0~25 | 0~15 | 0~70 | — | 12~30 |
| 300 | 25~98 | 0.1~2.0 | 0.8~4.0 | — | 0.02~0.2 | — | — | 0~60 | — | 12~30 |
| 400 | 25~98 | 0.1~2.0 | 0.8~4.0 | 0.8~10 | 0.02~0.2 | 1.5~15 | 0~15 | 0~60 | Si 0~2.5 | 12~30 |
| 500 | 25~95 | 0~2.5 | 0.8~15 | 0~15 | 0~0.5 | 0~25 | 0~15 | 0~10 | Se, La, $CeF_3$ 0.05~3.0 | 12~30 |
| 600 | 25~95 | 0~2.5 | 0.8~15 | 0~15 | 0~0.5 | 0~25 | 0~15 | 0~10 | Se, La, $CeF_3$ 0.05~3.0 Se 0~2.5 | 12~30 |
| 700 | 25~95 | 0.1~2.5 | 0.8~15 | 0.8~15 | 0.02~0.5 | 0~25 | — | Balance | $CeO_2$ or $CeF_3$ 0~10 $CaCO_3$ 2~20 Se 0~2.5 | 12~30 |
| 800 | 25~95 | 0.1~2.5 | 0.8~15 | 0.8~15 | 0.02~0.5 | 0~25 | — | Balance | $CeO_2$ or $CeF_3$ 0~10 $CaCo_3$ 2~20 | 12~30 |

The reasons for defining the chemical compositions of the flux cored wires as shown in Table 1 will now be described.

i. Flux Cored Wires Nos. 100 and 200

Calcium fluoride ($CaF_2$) in the filling flux is to make the slag formed in the welding strongly basic to thereby reduce the oxygen content of the deposited metal. Since the strong basic slag formed by the filling flux of this flux cored wire is formed only locally in the neighborhood of the molten pool, the use of this flux cored wire can not only improve drastically the working property as compared to the use of the known solid wire' where the entire welding flux is basic and the molten pool is covered by the strong basic slag but also reduce the oxygen content of the deposited metal to the level substantially the same as in the case where the known solid wire is used in combination with the strong basic welding flux. Thus, the use of solid wire in combination with strong basic welding flux results in the decrease in working property. However, since the flux cored wire Since these additive compositions are added from the flux cored wire directly to the molten pool, the reduction in yield owing to, as in the solid wire, oxidization in the arc and floating from the molten metal can be prevented. However, in order that these deoxidizing and denitrifying agents can function effectively, it is necessary to reduce the oxygen content of the molten metal by addition of calcium fluoride, namely by coaction with calcium fluoride, thereby improving the toughness of the deposited metal.

In this invention, high toughening alloying elements such as molybdenum (Mo) and nickel (Ni) are added to improve the structure of the deposited metal simultaneously to improve the toughness of the deposited metal. These elements, molybdenum and nickel, improve the hardenability of the deposited metal, overlap the hardenability improving effect of boron added simultaneously, restrain the formation of pro-eutectoid ferrite of the deposited metal, and further improve the toughness of the deposited metal. Molybdenum and nickel may be added from the hoop material to the deposited metal.

Thus, the various effects achieved by the filling flux compositions of the flux cored wire according to the present invention, such as deoxidizing and denitrifying high toughening, improving the structure, and restraining the pro-eutectoid ferrite, become more helpful in improvement of toughness of the deposited metal by virtue of the overlapping action of these compositions.

The reasons for limiting the compositions of the present invention will now be described.

Calcium fluoride, as described hereinabove, makes the welding slag strong basic and reduces the oxygen dissolution in the molten metal. In order to make the other deoxidizing and denitrifying agents function effectively, the content of calcium fluoride of 25 percent or more is necessary. However, the upper limit of the calcium fluoride content is limited by the amount of addition of other compositions.

Titanium (Ti) and aluminum (Al) act as deoxidizing and denitrifying agents and serve to increase the toughness of the deposited metal. However, when the adding amount of aluminum is 2.5 percent or more, there is a tendency that $SiO_2$ in the slag is reduced and silicon amount is increased, to thereby decrease the toughness. On the other hand, the addition of aluminum in 0.1 percent or less has no effect to improve the toughness. This confirms, accordingly, that the aluminum addition in the amount of 0.1 - 2.5 percent is preferable. When aluminum is added in the forms such as $Al_2O_3$ and $AlF_3$, the desired effect is not sufficiently obtained. Accordingly, it is essential that aluminum is added in the form of a metallic aluminum. Titanium addition is limited to 0.8 - 15 percent in view of the facts that the optimum yielding of Ti in the deposited metal is 0.04 percent, the Ti addition in 15 percent or more increases the silicon amount in the deposited metal to thereby decrease the toughness, and the Ti addition in 0.8 percent or less fails to provide the desired toughness owing to the shortage in titanium nitride.

Boron serves to increase the degrees of deoxidization and denitrification in the deposited metal, improve the structure of the deposited metal, restrain the formation of pro-eutectoid ferrite in the deposited metal, and induces fine grain formation of ferrite. However, the boron addition in 0.02 percent or less the formation of pro-eutectoid ferrite in the deposited metal is not restrained and, accordingly there is no effect of improvement in toughness. On the other hand, the boron addition in 0.5 percent or more will increase the boron amount in the deposited metal to thereby cause the cracking of the deposited metal.

Nickel (Ni) and molybdenum (Mo) are added for adjusting the toughness and strength since they increase both the toughness and strength of the deposited metal. However, the nickel addition in 25 percent or more is not desirable since the toughness improving effect is saturated and the cost is increased. When the molybdenum addition is 15 percent or more, the toughness improving effect is saturated, the strength is increased to more than desirable, and the cost is increased. And the molybdenum addition in 0.8 percent or less there is no effect to improve the toughness.

While manganese (Mn) is also added to improve the toughness, the addition thereof in 15 percent or more increases the silicon amount in the deposited metal to thereby decrease the toughness. However, these may be contained in the hoop material.

ii. Flux Cored Wires Nos. 300 and 400

In these flux cored wires, calcium fluoride ($CaF_2$) in 25 - 98 percent is used in the filling flux. The adding amount of calcium fluoride is limited to 25 - 98 percent, since, when 25 percent or lower, the oxygen amount in the weld metal is not different from that in the case where the common welding wire is used and the effect characteristic of the present invention is not obtained.

Further, the flux cored wire according to the present invention contains Al, Ti and B for deoxidization and denitrification of the weld metal. Since these elements are added as the flux cored wire directly into the weld metal, there is very little oxidization in the arc and floating from the molten pool, and they directly and effectively function for deoxidization and denitrification. In order that these deoxidizing and denitrifying agents function effectively, it is essential that the oxygen content of the weld metal is decreased to a certain degree. From this respect, the effect of using them jointly with $CaF_2$ is great.

The addition of Al is considerably effective in reducing the impact test fracture transition temperature of the weld metal zone, and the addition of Ti, B is effective in improving the impact test absorbed energy and reducing the fracture transition temperature. Accordingly, as a result of the composite addition of these three alloying elements, the toughness of the weld metal zone is drastically improved. However, when Ti and Al are added in large amounts, $SiO_2$ in the slag is reduced to increase the Si content in the weld metal to thereby reduce the toughness. Accordingly, it is not preferable that the amount of Al addition is 2.0 percent and the amount of Ti addition is 4.0 percent or more. And also, when Al is 0.10 percent or less and Ti is 0.8 percent or less, the improvement in toughness cannot be anticipated.

B deoxidizes and denitrifies the weld metal. B contained in the weld metal refines the structure to thereby increase the toughness. However, the B addition in 0.20 percent or more tends to cause cracking and, on the other hand, the addition thereof in 0.02 percent or less produces no effect.

The armoring tubular body of the flux cored welding wire according to the present invention is normally formed of carbon steel or low alloy steel hoop material. When the mechanical strength required in the weld zone is higher than the use and object of the material of base metal and the welded structure, one or two or more of C 0.01 - 0.10 percent, Si 0.30 percent or less, Mn 2.0 percent or less, Mo 0.2 - 1.0 percent, and Ni 0.5 - 3.0 percent are added to the composite welding wire, namely the hoop material or including flux, to thereby improve both the toughness and strength. In such case, the object can be achieved with good yielding by using low alloy material suitable for said object as the hoop material which will serve as the armor or by adding to the including flux said alloying elements in simple substance or alloyed iron such as Fe—Si, Fe—Mn, and Fe—Mo in granular form.

iii. Flux Cored Wires Nos. 500 and 600

Calcium fluoride ($CaF_2$) in the filling flux makes the slag formed in welding strong basic to thereby reduce the oxygen content of the weld metal and prevents titanium (Ti), selenium (Se), lanthanum-cerium (La-Ce), cerium fluoride (CeF$_3$) and other filling compositions from oxidization to thereby make these compositions to effectively function. Calcium fluoride also serves to improve the toughness of the weld metal by reducing the oxygen content of the weld metal.

Metallic aluminum, titanium and boron strengthen the deoxidization, fixes nitrogen in the weld metal, refines the structure of the weld metal, and restrains the formation of the pro-eutectoid ferrite.

Selenium (Se), lanthanum-cerium (La—Ce) and cerium fluoride (CeF$_3$) serve as desulfurizing agents to desulfurize by fixing sulfur as sulfides of selenium, lanthanum, and cerium to thereby double the toughness of the weld metal. Thus, the filling flux of the flux cored wire according to the present invention drastically improves the toughness of the weld metal by the multiplication effect of the deoxidizing effect, the refining of the structure, the restraining of the pro-eutectoid ferrite, and the desulfurizing effect.

CaF$_2$ is added to make the welding slag strong basic thereby reducing the oxygen content in the weld metal. It is necessary to use the including flux containing 25 percent or more CaF$_2$ in order to make the other deoxidizing, denitrifying and desulfurizing agents in the including flux to effectively function. Since Se, La—Ce, and CeF are desulfurizing agents and the addition of them in too large amount tends to be detrimental to the toughness, the upper limit of the amount of their addition is set to 3 percent.

Other compositions are as described hereinbefore.

iv. Flux Cored Wires Nos. 700 and 800

CaF$_2$ in the filling flux is added to make the slag formed in welding strong basic and to reduce the oxygen content of the deposited metal, thereby improving the toughness. To this end, it is necessary that CaF$_2$ is added in 25-95 percent. Metallic Al, Ti, and B are added respectively in 0.1-2.5 percent, 0.8-15 percent, and 0.02-0.5 percent to strengthen the deoxidization, to fix nitrogen in the deposited metal, to refine the structure of the deposited metal, and to restrain the formation of pro-eutectoid ferrite. Se, CeO$_2$ or CeF$_3$ serves as desulfurizing agent for removing sulfur by fixing it as sulfide of Se or Ce and for doubling the toughness of the deposited metal.

Since Ni and Mo increase both the toughness and strength of the deposited metal, they are added for adjusting not only the toughness but also the strength. To this end, they are added in the amount: Ni 0 – 25 percent, Mo 0.8 – 15 percent. They may be added in the hoop material. Thus, the filling flux of the flux cored wire added with CaF$_2$ and metal elements improves the toughness of the deposited metal by the multiplication of the deoxidizing effect, the refining of the structure, the restraining the pro-eutectoid ferrite, and the desulfurizing effect. On the other hand, the filling flux thus produced has, when compared with solid wires, disadvantages such that the bead width is smaller, there are more undercut and necking (arc off), and working property is inferior. This is attributed to the facts that the reignition voltage in the AC arc is very high, the possibility of arc off (no arc is generated when the reignition voltage is higher than the no-load voltage) is large, the bead form is damaged, negative fluorine ions (F$^-$) are generated in the arc space from calcium carbonate (CaCO$_3$) in the flux cored wire, neutralization is forwarded, and the potential gradient is increased.

It has been found, however, that when 2 –20 percent of CaCO$_3$ is added to the filling flux, good bead form having a large width is obtained and the working property of the composite wire can be improved identical to that of the solid wire.

Thus, Ca having a low ionization potential is presumably a main cause for capability of improving the bead form by adding CaCO$_3$ to the flux cored wire having high toughness. During arc ignition with AC arc, ions such as Ca$^{++}$ and F$^-$ are considered to be present in the arc space. At the time of arc extinction whereat the electric current becomes zero phase, the ions become unstable and are neutralized. In the wire added with 2 – 20 percent CaCO$_3$, however, since there is large amount of Ca, even when the reverse load is applied ionization easily takes place as Ca—→ Ca$^{++}$ and, therefore, even when turning to arc discharge since no great reignition potential is required the arc is considered to become stable and the bead form can be improved. In this case, however, when the adding amount of CaCO$_3$ becomes 20 percent or more by wire weight percent, a large amount of unstable CO$_2$ gas is generated by the welding reaction and sputtering is caused, to thereby damage the bead form. This phenomenon affects more adversely the welding of the rearward electrodes in the multi-electrode welding. Since the addition in 2 percent or less does not provide the effects, such as stabilizing of arc, the adding amount of CaCO$_3$ is set to 2 – 20 percent.

BRIEF DESCRIPTION OF THE DRAWING

The sole drawing is a graph showing the relation between the percentage of calcium carbonate and the bead width.

DESCRIPTION OF THE PREFERRED EMBODIMENTS

The examples and test results of the present invention will now be described hereinunder.

Example 1

Table 2

Chemical Composition of Test Sample (wt%)

| Number | C | Si | Mn | P | S | V | Nb | Thickness (mm) |
|--------|------|------|------|-------|-------|-------|------|------|
| (I) | 0.08 | 0.31 | 1.33 | 0.016 | 0.008 | 0.061 | 0.04 | 17 |

Table 3

Chemical Composition of Flux Cored Wire (Flux Ratio 15%)

| Number | Hoop Material (wt%) | | | | | Filling Flux (wt%) | | | | | | | |
|---|---|---|---|---|---|---|---|---|---|---|---|---|---|
| | C | Si | Mn | P | S | CaF$_2$ | Al | Ti | Mo | B | Ni | Mn | Fe |
| 201 | 0.06 | — | 0.32 | 0.005 | 0.010 | 64 | 0.8 | 3.2 | 4.0 | 0.12 | 8.0 | 7.2 | Balance |
| 202 | do. | — | do. | do. | do. | 80 | do. | do. | do. | do. | — | do. | do. |
| 203 | do. | — | do. | do. | do. | 80 | do. | do. | 7.2 | do. | — | do. | do. |
| 204 | do. | — | do. | do. | do. | 76 | do. | do. | 4.0 | 0.08 | 8.0 | do. | — |
| 205 | do. | — | do. | do. | do. | 76 | do. | do. | do. | 0.16 | 8.0 | do. | — |

Table 4

| Welding Conditions | |
|---|---|
| Number of Welding Layer | One layer welding each at front and back |
| Method of Welding | Flux cored wire two electrode submerged arc welding |
| Combined Flux | Fused type basic flux |
| Heat Input Amount | 50000 J/cm |
| Welding Condition | Forward 43$^1$×1200$^4$+Rearward 55$^1$×700$^4$ |
| Welding Speed | 110 cm/min |

Table 5

Chemical Composition of Deposited Metal Zone (wt%)

| Number | C | Si | Mn | P | S | Ni |
|---|---|---|---|---|---|---|
| 201 | 0.08 | 0.41 | 1.33 | 0.017 | 0.015 | 0.32 |
| 202 | 0.08 | 0.42 | 1.29 | 0.015 | 0.010 | — |
| 203 | 0.08 | 0.42 | 1.33 | 0.014 | 0.010 | — |
| 204 | 0.08 | 0.40 | 1.32 | 0.015 | 0.010 | 0.38 |
| 205 | 0.08 | 0.42 | 1.33 | 0.018 | 0.017 | 0.37 |

| Number | Mo | V | Nb | Ti | B |
|---|---|---|---|---|---|
| 201 | 0.18 | 0.043 | 0.012 | 0.042 | 0.002 |
| 202 | 0.18 | 0.039 | 0.023 | 0.040 | 0.002 |
| 203 | 0.34 | 0.041 | 0.025 | 0.043 | 0.001 |
| 204 | 0.20 | 0.040 | 0.025 | 0.045 | 0.001 |
| 204 | 0.20 | 0.039 | 0.025 | 0.045 | 0.002 |

Table 6

Impact Characteristics of Deposited Metal Zone (JIS-No.4 Charpy Value Kg-m)

| Number | −10°C | −20°C |
|---|---|---|
| 201 | 9.8, 8.8, 8.8 (9.1) | 7.0, 6.0, 5.6 (6.2) |
| 202 | 6.8, 6.0, 5.5 (6.1) | 5.7, 4.8, 4.9 (5.1) |
| 203 | 12.9, 11.0, 9.7 (11.2) | 9.7, 9.0, 10.9 (9.9) |
| 204 | 9.4, 9.8, 8.6 (9.3) | 6.4, 6.1, 5.7 (6.1) |
| 205 | 9.9, 10.2, 7.2 (9.1) | 9.2, 7.6, 8.3 (8.4) |

Example 2

Chemical Composition of Test Sample: Same as Table 2.

Table 7

Chemical Compositions of Flux Cored Wire and Solid Wire

Composition of Flux Cored Wire (Flux Ratio 20%)

| | Hoop Material (wt%) | | | | | Filling Flux (wt%) | | | | | | |
|---|---|---|---|---|---|---|---|---|---|---|---|---|
| | C | Si | Mn | P | S | CaF$_2$ | Al | Ti | Mo | B | Ni | Mn |
| 206 | 0.08 | — | 0.3 | 0.010 | 0.010 | 71 | 0.9 | 4.2 | 6.0 | 0.15 | 12 | 5.4 |

Composition of Solid Wire (wt%)

| | C | Si | Mn | P | S | Mo | Cu |
|---|---|---|---|---|---|---|---|
| A | 0.12 | 0.02 | 1.49 | 0.018 | 0.017 | 0.51 | 0.10 |
| B | 0.05 | 0.01 | 0.46 | 0.007 | 0.014 | — | 0.09 |

Table 8

Welding Conditions

| | |
|---|---|
| Number of Welding Layer | One layer welding each at front and back |
| Method of Welding | Two electrodes submerged arc welding |
| Forward Electrode | Flux cored wire (F) |
| Rearward Electrode | Solid wire A or B |
| Combined Flux | Fused type basic flux |
| Heat Input Amount | 50000 J/cm |
| Welding Condition | Forward 43¹×1050⁴+Rearward 45¹×750⁴ |
| Welding Speed | 95 cm/min |

Table 9

Chemical Composition of Deposited Metal Zone (wt%)

| Number | Forward Electrode | Rearward Electrode | C | Si | Mn | P | S | Ni |
|---|---|---|---|---|---|---|---|---|
| (i) | 206 | A | 0.09 | 0.45 | 1.35 | 0.016 | 0.011 | 0.50 |
| (ii) | 206 | B | 0.08 | 0.40 | 1.27 | 0.014 | 0.010 | 0.43 |

| Number | Forward Electrode | Rearward Electrode | Mo | V | Nb | Ti | B |
|---|---|---|---|---|---|---|---|
| (i) | 206 | A | 0.30 | 0.04 | 0.025 | 0.055 | 0.002 |
| (ii) | 206 | B | 0.21 | 0.04 | 0.025 | 0.055 | 0.002 |

Table 10

Impact Characteristics of Deposited Metal Zone (JIS-No.4 Charpy Value Kg-m)

| No. | −10°C | −20°C |
|---|---|---|
| (i) | 9.0, 10.0, 11.0 (10.0) | 9.2, 8.6, 9.2 (9.0) |
| (ii) | 15.3, 14.0, 13.2 (14.1) | 11.9, 12.6, 10.0 (11.5) |

Example 3 (Water Cool Submerged Arc Welding)
Chemical Composition of Test Sample: Same as Table 2.

Table 11

Chemical Compositions of Flux Cored Wire (Flux Ratio : 20)

| | Hoop Material (wt%) | | | | | Including Flux (wt%) | | | | | |
|---|---|---|---|---|---|---|---|---|---|---|---|
| Number | C | Si | Mn | P | S | CaF₂ | Al | Ti | Mo | B | Ni | Mn |
| 207 | 0.06 | Trace | 0.3 | 0.012 | 0.010 | 76 | 0.8 | 3.2 | 4.0 | 0.12 | 8.0 | 7.2 |
| 208 | 0.06 | do. | 0.3 | 0.012 | 0.010 | 81 | 0.8 | 3.2 | 7.2 | 0.12 | — | 7.2 |

Table 12

Welding Conditions

| | |
|---|---|
| Number of Welding Layer | One layer welding each at front and back |
| Welding Method | Flux cored wire two electrodes water cool submerged arc welding method |
| Combined Flux | Fused type basic flux |
| Heat Input Amount | 50000 J/cm |
| Water Cooling Method | Water cool the backside of the bead during welding |
| Welding Condition | Forward 43¹×1200⁴+Rearward 55¹×700⁴ |
| Welding Speed | 110 cm/min |

Table 13

Chemical Composition of Deposited Metal Zone (wt%)

| Number | C | Si | Mn | P | S | Ni | Mo | V | Nb | Ti | B |
|---|---|---|---|---|---|---|---|---|---|---|---|
| 207 | 0.08 | 0.42 | 1.33 | 0.018 | 0.017 | 0.38 | 0.20 | 0.04 | 0.03 | 0.05 | 0.002 |
| 208 | 0.08 | 0.42 | 1.33 | 0.014 | 0.010 | — | 0.34 | 0.04 | 0.03 | 0.04 | 0.001 |

Table 14

Impact Characteristics of Deposited Metal Zone (JIS-No.4 Charpy Value Kg-m)

| Number | −30°C | | | −60°C | | |
|---|---|---|---|---|---|---|
| 207 | 10.4, | 9.5, | 9.4 | 8.5, | 8.0, | 8.0 |
| | 9.0, | 8.1, | (9.3) | 7.5, | 7.6, | (7.9) |
| 208 | 11.2, | 10.8, | 10.5 | 10.4, | 9.5, | 9.0 |
| | 10.4, | 9.2, | (10.4) | 8.8, | 8.1, | (9.2) |

Comparative Example (The conventional solid wire two electrodes method)

Chemical Composition of Test Sample: Same as Table 2.

Table 15

Chemical Compositions of Solid Wire (wt%)

| No. | C | Si | Mn | P | S | Cu | Mo |
|---|---|---|---|---|---|---|---|
| C | 0.12 | — | 1.49 | 0.018 | 0.017 | 0.10 | 0.51 |

Table 16

Welding Conditionz

| | |
|---|---|
| Welding Method | Two electrodes submerged arc welding |
| Number of Welding Layer | One layer welding each at front and back |
| Combined Flux | Fused type basic flux |
| Heat Input Amount | 50000 J/cm |
| Welding Condition | Forward $38^r \times 1200^A$+Rearward $43^r \times 750^A$ |
| Welding Speed | 110 cm/min |

According to the present invention, as is obvious from the above descriptions, the value of absorbed energy of the impact test in various composition systems are drastically improved and the brittle fracture is considerably lessened compared with the deposited metal of the case where the conventional solid wire is used. And, as is obvious from the welding conditions in the Examples, the weld working property is substantially the same as in the conventional art in spite of the fact that a large amount of high basic compositions are added to the filling flux included in the flux cored wire.

Example 4

To the test sample (welding base metal) having the chemical composition shown in Table 19 was welded a welding wire according to the present invention as shown in Table 20 by submerged arc welding under the welding condition shown in Table 21. The results of measurements of the impact value and chemical compositions of the weld metal zone thus welded are shown in Tables 22 and 23.

Table 17

Chemical Composition of Deposited Metal Zone (wt%)

| Number | C | Si | Mn | P | S | Mo | V | Nb | Ti |
|---|---|---|---|---|---|---|---|---|---|
| C | 0.09 | 0.40 | 1.30 | 0.017 | 0.011 | 0.20 | 0.037 | 0.020 | 0.006 |

Table 18

Impact Characteristics of Deposited Metal Zone
(JIS-No.4 Charpy Value Kg-m)

| Number | 0°C | −10°C | −20°C | −40°C |
|---|---|---|---|---|
| C | 5.1 5.6, 5.4 (5.4) | 4.3, 4.8, 4.0 (4.4) | 3.6, 3.6, 4.1 (3.8) | 2.1, 2.2, 2.8 (2.4) |

Table 19

Chemical Composition of the Test Sample (wt%)

| Number | C | Si | Mn | P | S | Nb | Thickness (mm) |
|---|---|---|---|---|---|---|---|
| (II) | 0.20 | 0.47 | 1.42 | 0.021 | 0.018 | 0.03 | 30 |

Table 20

Chemical Compositions of the Flux Cored Wire and the Solid Wire

| Number | | Hoop Material (A) (wt%) | | | | | Filling Flux (B) (wt%) | | | | | Flux Ratio % |
|---|---|---|---|---|---|---|---|---|---|---|---|---|
| | | C | Si | Mn | P | S | CaF$_2$ | Al | Ti | B | Fe | B/A |
| 301 | This Invention | 0.06 | — | 0.40 | 0.012 | 0.015 | 60 | 0.6 | 2.0 | 0.12 | Balance | 15 |
| D | Prior art | 0.05 | — | 0.50 | 0.010 | 0.010 | — | — | — | — | — | — |

Table 21

Welding Conditions

| | Using welding wire of this invention | Using welding wire of prior art |
|---|---|---|
| Bevel form of Test Sample | 50°V bevel | same |
| Welding Method | Two electrodes submerged arc welding | same |
| Combined Flux | Bond flux suitable for SM50 steel | same |
| Welding Heat Input | 100,000 Joules/cm | same |
| Welding Condition | Forward $45^F \times 800^A$ + Rearward $50^F \times 620^A$ | same |
| Welding Speed | 40 cm/min | same |

Table 22

Impact Characteristics of Deposited Metal Zone
(JIS-No.4 Charpy Value Kg-m)

| Test Temperature | 0°C | −20°C |
|---|---|---|
| Using Flux Cored Wire (301) of this Invention | 16.6 17.8 18.5 (17.6) | 16.0 15.8 14.5 (15.4) |
| Using Welding Wire (D) of Prior Art | 6.0 6.4 6.8 (6.4) | 4.5 4.3 4.4 (4.4) |

Parenthesized values indicate averages.

Table 23

Chemical Compositions of Deposited Metal Zone (wt%)

| Number | C | Si | Mn | P | S | Mo | Nb | Ti | B | Sol AC |
|---|---|---|---|---|---|---|---|---|---|---|
| 301 | 0.07 | 0.32 | 1.53 | 0.016 | 0.010 | 0.63 | 0.008 | 0.032 | 0.003 | 0.012 |
| D | 0.08 | 0.40 | 1.54 | 0.020 | 0.012 | 0.60 | 0.010 | 0.015 | — | 0.010 |

Table 26

Welding Conditions

| | Using welding wire of this invention | Using welding wire of prior art |
|---|---|---|
| Bevel form of Test Sample | 90° × bevel | same |
| Welding Method | Two electrodes submerged arc welding | same |
| Combined Flux | Fused type basic flux | same |
| Welding Heat Input | 50,000 Joules/cm | same |
| Welding Conditions | Forward $43^F \times 1200^A$ + Rearward $55^F \times 700^A$ | same |
| Welding Speed | 110 cm/min | same |

Example 5

To the three kinds of test samples having the chemical compositions shown in Table 24 was welded a flux cored wire according to the present invention as shown in Table 25 by submerged arc welding under the welding condition shown in Table 26. The results of measurements of the impact value and chemical compositions of the weld metal zone thus welded are shown in Table 27 and 28.

Table 24

| Number | C | Si | Mn | P | S | V | Nb | Thickness (mm) |
|---|---|---|---|---|---|---|---|---|
| (III) | 0.08 | 0.1 | 1.33 | 0.016 | 0.008 | 0.061 | 0.02 | 16 |
| (IV) | 0.10 | 0.32 | 1.31 | 0.012 | 0.015 | 0.03 | — | 16 |
| (V) | 0.11 | 0.31 | 1.33 | 0.014 | 0.015 | <0.01 | 0.02 | 16 |

TABLE 25

Chemical compositions of the flux cored wire and solid wire

| Number | Hoop material (A) (weight percent) | | | | | | Filling flux (B) (weight percent) | | | | | | | Flux ratio (percent) B/A |
|---|---|---|---|---|---|---|---|---|---|---|---|---|---|---|
| | C | Mn | Mo | P | S | Cu | CaF₂ | Al | Ti | Mo | B | Ni | Mn | Fe | |
| 401 This invention | 0.06 | 0.32 | — | 0.005 | 0.010 | — | 40 | 0.6 | 2.0 | 2.5 | 0.08 | 5.0 | 4.5 | Balance | 2/0 |
| E Prior art | 0.12 | 1.50 | 0.50 | 0.018 | 0.017 | 0.10 | | | | | | | | | |

Table 27

Impact Characteristics of Deposited Metal Zone (JIS-No.4 Charpy Value Kg-m)

| Test Temperature | | 0°C | | −10°C | | | | −20°C | | | |
|---|---|---|---|---|---|---|---|---|---|---|---|
| Test Sample (III) | Using Welding Wire 401 of | 10.2 9.3 8.2 (9.2) | | 9.8 | 8.8 | 8.8 | (9.1) | 7.0 | 6.0 | 5.6 | (6.2) |
| Test Sample (III) | Using Prior art Welding Wire E | 5.3 5.1 5.1 (5.2) | | 4.0 | 4.1 | 4.0 | (4.0) | 3.8 | 4.0 | 3.7 | (3.8) |
| Test Sample (IV) | Using Welding Wire (401) of this Invention | — | | 12.9 | 11.3 | 11.4 | (11.9) | 11.6 | 12.1 | 13.1 | (12.3) |
| Test Sample (V) | Using Welding Wire (401) of this Invention | — | | 14.5 | 13.9 | 13.0 | (13.6) | — | | | |

Parenthesized values indicate averages.

TABLE 28

Chemical compositions of deposited metal zone (weight percent)

| Test Sample | | C | Si | Mn | P | S | Ni | Mo | V | Nb | Ti | B | Al |
|---|---|---|---|---|---|---|---|---|---|---|---|---|---|
| (III) | Using welding wire (401) of this invention | 0.08 | 0.41 | 1.33 | 0.017 | 0.015 | 0.32 | 0.18 | 0.043 | 0.012 | 0.042 | 0.003 | 0.010 |
| (III) | Using prior art welding wire (E) | 0.09 | 0.40 | 1.30 | 0.016 | 0.011 | — | 0.20 | 0.040 | 0.010 | 0.006 | — | 0.008 |
| (IV) | Using welding wire (401) of this invention | 0.09 | 0.40 | 1.33 | 0.017 | 0.019 | 0.48 | 0.22 | 0.020 | 0.007 | 0.051 | 0.003 | 0.012 |
| V | do | 0.09 | 0.39 | 1.30 | 0.017 | 0.018 | 0.48 | 0.22 | 0.005 | 0.011 | 0.049 | 0.003 | 0.012 |

As is obvious from the above Examples, in the submerged arc welding using the flux cored wire according to the present invention, toughness, especially low temperature impact value of the weld metal zone is drastically improved as high as substantially double those in the case where the conventional welding wire is used.

As described above, the present invention is industrially advantageous in that the structure of welded metal zone having high toughness and reliability can be made without reducing the weld working property. The advantage of the present invention is excellent particularly in weldability of high tension steel plate in shipbuilding and line pipe in a cold district.

Example 6

Table 29

Chemical Composition of the Test Sample (wt%)

| Number | C | Si | Mn | P | S | Nb | Thickness (mm) |
|---|---|---|---|---|---|---|---|
| (VI) | 0.18 | 0.36 | 1.38 | 0.005 | 0.012 | 0.05 | 35 |

Table 30

Chemical Compositions of the Flux Cored Wire
(Flux Ratio 20%)

| | Hoop Material (wt%) | | | | | Filling Flux (wt%) | | | | | | |
|---|---|---|---|---|---|---|---|---|---|---|---|---|
| Number | C | Si | Mn | P | S | CaF$_2$ | Ti | B | Fe | Se | La-Ce | CeF$_3$ |
| 601 | 0.06 | trace | 0.3 | <0.01 | <0.01 | 96 | 2.0 | 0.1 | Balance | 1.0 | — | — |
| 602 | do. | do. | do. | do. | do. | 96 | do. | do. | do. | — | 1.0 | — |
| 603 | do. | do. | do. | do. | do. | 94 | do. | do. | do. | — | — | 3.0 |

Table 31

Solid Wire for Comparison

| Number | C | Si | Mn | P | S |
|---|---|---|---|---|---|
| F | 0.05 | trace | 0.46 | 0.007 | 0.014 |

Table 32

Welding Conditions

| | |
|---|---|
| Welding Method | Three electrodes submerged arc welding |
| Number of Welding Layer | One layer welding |
| Combined Flux | Burning type flux added with Mo |
| Heat Input Amount | 260,000 Joules/cm |
| Welding Condition | 800A×36V+Forward 1000A×43V+Rearward 1100A×53V |
| Welding Speed | 30 cm/min |

Table 33

Chemical Compositions of Deposited Metal Zone (wt%)

| Number | C | Si | Mn | P | S | Ni | Mo | Nb | Ti | B | Se | Ce |
|---|---|---|---|---|---|---|---|---|---|---|---|---|
| 601 | 0.12 | 0.54 | 1.50 | 0.014 | 0.008 | 0.02 | 0.22 | 0.025 | 0.040 | 0.0030 | 0.001 | — |
| 602 | 0.11 | 0.50 | 1.54 | 0.013 | 0.008 | 0.02 | 0.23 | 0.025 | 0.043 | 0.0025 | — | 0.001 |
| 603 | 0.11 | 0.55 | 1.45 | 0.015 | 0.011 | 0.02 | 0.28 | 0.026 | 0.040 | 0.0028 | — | 0.001 |
| F | 0.11 | 0.32 | 1.23 | 0.015 | 0.014 | 0.02 | 0.25 | 0.023 | <0.01 | — | — | — |

Table 34

Impact Characteristics of Deposited Metal Zone (JIS-No.4 Charpy Value Kg-m)

| Number | 0°C | −20°C | −40°C |
|---|---|---|---|
| 601 | 8.5 | 6.1 | 4.4 |
| 602 | 9.8 | 6.3 | 3.8 |
| 603 | 7.9 | 5.9 | 3.7 |
| F | 4.8 | 3.4 | 1.8 |

Example 7

Table 35

Chemical Composition of the Test Sample (wt%)

| Number | C | Si | Mn | P | S | V | Nb | Thickness (mm) |
|---|---|---|---|---|---|---|---|---|
| (VII) | 0.08 | 0.31 | 1.33 | 0.016 | 0.008 | 0.06 | 0.03 | 20 |

Table 36

Chemical Composition of the Flux Cored Wire (Flux Ratio 19%)

| Number | Hoop Material (wt%) | | | | | Filling Flux (wt%) | | | | | | |
|---|---|---|---|---|---|---|---|---|---|---|---|---|
| | C | Si | Mn | P | S | CaF$_2$ | Al | Ti | Mo | B | Ni | Se | Fe |
| 604 | 0.06 | trace | 0.3 | <0.01 | <0.01 | 79 | 0.6 | 2.5 | 7 | 0.15 | 5 | 18 | Balance |

Table 37

Welding Condition

| | |
|---|---|
| Welding Method | One layer welding each at front and back submerged arc welding with two electrodes |
| Combined Flux | Melting type neutral Flux |
| Welding input heat | 55000 J/cm |
| Welding Condition | 43V×1130A+45V×750A |
| Welding Speed | 90 cm/min |

Table 38

Chemical Composition of Deposited Metal Zone

| Number | C | Si | Mn | P | S | Ni | Mo | V | Nb | Ti | B | Se |
|---|---|---|---|---|---|---|---|---|---|---|---|---|
| 604 | 0.07 | 0.42 | 1.29 | 0.009 | 0.007 | 0.49 | 0.41 | 0.035 | 0.018 | 0.042 | 0.0026 | 0.001 |

Table 39

Impact Characteristics of Deposited Metal Zone (JIS-No.4 Charpy Value Kg-m)

| Number | 0°C | −10°C | −20°C | −40°C | −60°C |
|---|---|---|---|---|---|
| 604 | 11.7 | 10.9 | 9.5 | 7.0 | 4.9 |

Table 44

Impact Characteristics of Deposited Metal Zone (JIS-No.4 Charpy Value Kg-m)

| Number | 0°C |
|---|---|
| 801 | 12.9 |
| 802 | 12.6 |
| 803 | 11.5 |
| 209 (Comparison) | 12.5 |

Example 8

Table 40

Chemical Composition of the Test Sample (wt%)

| Number (VIII) | C | Si | Mn | P | S | V | Nb | Cu | Cr | Thickness |
|---|---|---|---|---|---|---|---|---|---|---|
| | 0.08 | 0.35 | 1.30 | 0.013 | 0.006 | 0.07 | 0.017 | 0.17 | 0.13 | 19 |

Table 41

Chemical Composition of the Flux Cored Wire (Flux Ratio 19%)

| | Hoop Material (wt%) | | | | | Filling Flux (wt%) | | | | | | | |
|---|---|---|---|---|---|---|---|---|---|---|---|---|---|
| Number | C | Si | Mn | P | S | CaF$_2$ | Al | Ti | Mo | B | Ni | Fe | CaCo$_3$ |
| 801 | 0.06 | trace | 0.3 | <0.01 | <0.01 | 68.7 | 0.8 | 4.8 | 8.2 | 0.27 | 13.7 | Balance | 3.4 |
| 802 | do. | do. | do. | do. | do. | 66.4 | do. | 4.7 | 8.0 | do. | 13.2 | do. | 6.6 |
| 803 | do. | do. | do. | do. | do. | 64.3 | do. | 4.5 | 7.7 | do. | 12.9 | do. | 9.6 |
| 209 (Comparison) | do. | do. | do. | do. | do. | 71.2 | 0.9 | 5.0 | 8.5 | do. | 14.2 | do. | — |

Table 42

Solid Wire Used in Rearward (wt%)

| Number | C | Si | Mn | P | S | Cu | Mo |
|---|---|---|---|---|---|---|---|
| G | 0.10 | 0.02 | 1.45 | 0.018 | 0.017 | 0.10 | 0.51 |

(Note)
G wire was used as the rearward wire of the two electrodes.

Table 43

Welding Conditions

| Welding Method | Two electrodes submerged arc welding (Forward Cored Wire, Rearward Solid Wire) |
|---|---|
| Welding Input Heat | 48,000 J/cm |
| Welding Condition | Forward 42V×1150A+Rearward 50V×800A |
| Welding Speed | 110 cm/min |

Regarding the working property, the variation in bead width to accompany the variation in percentage of $CaCO_3$ is illustrated as in the attached drawing considering that the arc is stable when the bead width is large.

We claim:

1. A flux cored wire for submerged arc welding which comprises in combination, a sheath formed of carbon steel or low alloy steel, and a flux filled within the sheath said flux consisting essentially of 25–95% $CaF_2$, 0.1–2.5%Al, 0.8–15%Ti, 0.02–0.5%B, 0.8–15%Mo, 0–25%Ni, 0–25%Se, 0–10%$CeO_2$ or $CeF_3$, 2–20%$CaCo_3$, and the balance Fe, all percentages by weight, the percentages of total weight of flux to weight of sheath material being 12–30 percent.

2. The flux cored wire for submerged arc welding as set forth in claim 1 wherein the sheath material consists essentially of 0.01–0.10%C, trace –0.30%Si, trace – 1.5%Mn, up to 1.5%Mo, up to 3.0%Ni, and the balance Fe, all percentages by weight.

* * * * *